(12) United States Patent
Guilmard et al.

(10) Patent No.: US 7,743,965 B2
(45) Date of Patent: Jun. 29, 2010

(54) PROCESS TO DEPOSIT A PROTECTIVE COATING ON THE INNER WALL OF A TUBE, AND NOTABLY A GUN BARREL PRODUCED ACCORDING TO THIS PROCESS

(75) Inventors: Yann Guilmard, Bourges (FR); Pascal Sabourin, Bourges (FR); Jean-Luc Coupeau, Plaimpied (FR); Alain Proner, Lirac (FR); Jean-Philippe Dacquet, Nimes (FR)

(73) Assignee: Giat Industries, Versailles (FR)

( * ) Notice: Subject to any disclaimer, the term of this patent is extended or adjusted under 35 U.S.C. 154(b) by 1119 days.

(21) Appl. No.: 10/498,115

(22) PCT Filed: Nov. 28, 2002

(86) PCT No.: PCT/FR02/04093

§ 371 (c)(1),
(2), (4) Date: Jun. 9, 2004

(87) PCT Pub. No.: WO03/047802

PCT Pub. Date: Jun. 12, 2003

(65) Prior Publication Data

US 2005/0017056 A1 Jan. 27, 2005

(30) Foreign Application Priority Data

Dec. 7, 2001 (FR) .................................. 01 15883

(51) Int. Cl.
*B23K 1/20* (2006.01)
*F41A 21/02* (2006.01)
(52) U.S. Cl. ........................ 228/203; 228/214; 228/132; 138/142; 138/143; 89/14.7; 89/16; 42/76.01; 42/76.02

(58) Field of Classification Search ................. 228/103, 228/214, 132, 213, 203, 107; 29/527.6, 421.1; 138/142, 143; 42/76.01, 76.02; 89/14.7, 89/16
See application file for complete search history.

(56) References Cited

U.S. PATENT DOCUMENTS

| 930,927 | A | * | 8/1909 | Berkstresser ................ 228/132 |
| 3,025,596 | A | * | 3/1962 | Ward et al. ................... 228/131 |
| 3,101,531 | A | * | 8/1963 | Roseberry .................... 228/132 |
| 3,170,227 | A | | 2/1965 | Richmond et al. |
| 3,584,655 | A | * | 6/1971 | Frank et al. .................. 138/109 |
| 3,620,691 | A | * | 11/1971 | Rubel .......................... 428/381 |
| 4,028,785 | A | * | 6/1977 | Jackson et al. .......... 29/890.053 |
| 4,319,121 | A | * | 3/1982 | Yoshida ................. 219/121.14 |

(Continued)

FOREIGN PATENT DOCUMENTS

EP 0 743 124 A1 11/1996

(Continued)

*Primary Examiner*—Jessica L. Ward
*Assistant Examiner*—Michael Aboagye
(74) *Attorney, Agent, or Firm*—Oliff & Berridge, PLC

(57) ABSTRACT

A method for setting a protective coating on the inner wall of a tube includes providing a cylindrical sleeve, then setting on the outer surface of the sleeve a layer of a thermo fusible material, then machining the sleeve to provide it with an external diameter corresponding to the tube internal diameter, positioning the sleeve in the tube, and finally soldering the sleeve on the tube by applying heat.

17 Claims, 2 Drawing Sheets

U.S. PATENT DOCUMENTS

| | | | | |
|---|---|---|---|---|
| 4,795,078 A | * | 1/1989 | Kuroki et al. | 228/131 |
| 4,873,127 A | * | 10/1989 | Onodera et al. | 427/376.8 |
| 5,435,965 A | * | 7/1995 | Mashima et al. | 419/8 |
| 5,440,095 A | * | 8/1995 | Yoshie et al. | 219/121.63 |
| 5,466,907 A | * | 11/1995 | Vuitton | 219/121.59 |
| 5,484,974 A | | 1/1996 | Vellmer et al. | |
| 5,741,556 A | * | 4/1998 | Taylor et al. | 427/453 |
| 5,871,139 A | * | 2/1999 | Moyer | 228/264 |
| 6,325,278 B1 | | 12/2001 | Bull et al. | |
| 6,511,710 B2 | * | 1/2003 | Warnecke | 427/449 |
| 6,649,682 B1 | * | 11/2003 | Breton et al. | 524/404 |
| 6,780,364 B2 | * | 8/2004 | Chiang et al. | 264/240 |

FOREIGN PATENT DOCUMENTS

| | | |
|---|---|---|
| EP | 0 764 493 A1 | 3/1997 |
| GB | EP 0510598 A2 * | 10/1992 |

* cited by examiner

PROCESS TO DEPOSIT A PROTECTIVE COATING ON THE INNER WALL OF A TUBE, AND NOTABLY A GUN BARREL PRODUCED ACCORDING TO THIS PROCESS

BACKGROUND

The technical scope of this invention is that of processes to install a protective coating on the inner wall of a tube.

The invention relates in particular to gun barrels.

During firing, gun barrels are subjected to heavy thermal and mechanical constraints that lead to premature wear.

Attempts have been made to reduce such wear by depositing a wear-resistant material, such as hard chromium, on the inner surface of the barrel.

To make such a coating an electroplating process is generally used.

This process is costly. It implements voluminous electroplating baths able to receive a gun barrel (4 to 6 m in length) and thus consumes a lot of electrical energy.

Moreover, a coating of chromium electroplating does not have sufficient mechanical strength when modern heavily corrosive ammunition is fired.

Coatings of potentially stronger materials have been made that have a higher melting point (tungsten, molybdenum).

These materials are deposited, for example, by explosion plating or plasma projection.

Patent EP1048921 thus describes a plasma projection process and patent EP1059502 describes an explosion projection process.

Processes implementing explosives are complicated to carry out and cause deformations to the gun barrel.

Plasma projection processes require a machining operation after coating. Moreover, there is no guarantee of obtaining a coating whose structure is homogeneous over the full length of the barrel using such processes.

SUMMARY

The aim of the invention is to propose a process to deposit a protective coating on the inner surface of a tube which does not suffer from such drawbacks.

Thus, the process according to the invention allows a coating to be carried out at a reduced cost which does not require more than minor machining.

The invention also relates to a tube, notably a gun barrel, having improved resistance to wear.

Thus, the invention relates to a process to deposit a protective coating on the inner wall of a tube, such process characterized by the following steps:

A cylindrical sleeve is produced,

A layer of thermo fusible material is placed on the external surface of this sleeve, The sleeve thus coated is machined so as to give it the same external diameter as the internal diameter of the tube, The sleeve is positioned in the tube, The sleeve is soldered in the tube by having localized heating means placed inside it and gradually moved longitudinally from one end to the other of the sleeve.

The thermo fusible material will preferably have a melting point of between 600° C. and 1100° C.

The sleeve may be made of a material having a high melting point.

The sleeve may be made of a sheet rolled around and welded edge to edge.

The sleeve may be welded by electron beam or laser welding.

According to another embodiment, the sleeve may be made by machining or sintering.

The sleeve may in any event be made of a material from among the following: Tantalum, Tungsten, Molybdenum, Chromium, Niobium, Hafnium, Vanadium, Zirconium, or their alloys.

The thermo fusible material may advantageously be made by thermal projection of a thermo fusible material powder.

The thermo fusible material may be selected from among the cobalt or nickel alloys.

The thickness of the layer of thermo fusible material may be of around 1 mm.

Preferably, the layer of thermo fusible material will be re-melted before machining to avoid porosities.

The localized heating means used for soldering comprise a plasma torch with transferred arc (PTA) with no added powder, means being provided to ensure a relative rotating movement of the torch with respect to the tube, such rotation combined with a relative translation of the torch with respect to the tube.

Alternatively, the localized heating means enabling the soldering may comprise a source ensuring heating by cylindrical symmetry, means being provided translate the source with respect to the tube.

The invention also relates to a tube, notably a gun barrel, made using such a process, tube wherein it incorporates an inner coating formed of at least one cylindrical sleeve soldered in the tube.

The sleeve may be made of a material having a high melting point. The sleeve material may thus be chosen from among: Tantalum, Tungsten, Molybdenum, Chromium, Niobium, Hafnium, Vanadium, Zirconium, or their alloys.

Soldering may be carried out using a thermo fusible material having a melting temperature of between 600° C. and 1100° C.

Soldering may notably be carried out using a material from among the cobalt or nickel alloys. The thickness of the sleeve may be greater than or equal to 1 mm. The soldering thickness may be of around 1 mm.

BRIEF DESCRIPTION OF THE DRAWINGS

The invention will become more apparent from the following description of a particular embodiment, such description being made in reference to the appended drawings, in which.

DETAILED DESCRIPTION

Figure 1:
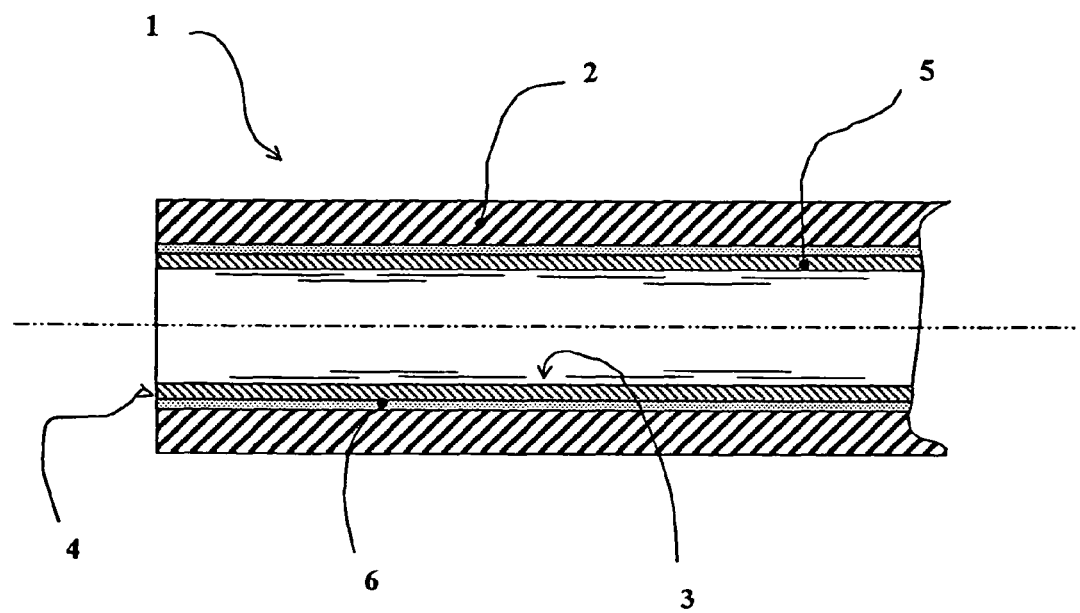
FIG. 1 shows a barrel according to the invention.

With reference to FIG. 1, a gun barrel 1 according to the invention, incorporates a cylindrical bore 2 of cannon steel incorporating an axial bore 3.

The axial bore incorporates an inner liner 4 constituted by a cylindrical sleeve 5 made integral with the bore 1 of the barrel by soldering 6.

The sleeve 5 is made of a material having a high melting point (over 1850° C.).

The sleeve may, for example, be made of Tantalum, Tungsten, Molybdenum, Chromium, Niobium, Hafnium, Vanadium, Zirconium, or an alloy of one or several of these materials. The sleeve will be of a thickness of around 1 mm.

This sleeve will be made with an external diameter that allows it to be introduced into the barrel and will have an internal bore close to the caliber required for the weapon.

Soldering 6 allows the bore 2 of the barrel to be joined to the sleeve 5 and is made using a thermo fusible material of the nickel or cobalt based alloy type. Other materials may be envisaged. Their thermal and thermo-mechanical properties will be selected by somebody skilled in the Art so that the soldering is carried out at the lowest possible temperature, whilst remaining compatible with the stress level borne by the barrel during firing and with the metallurgical nature of the material forming the sleeve.

Thus, the melting temperatures of the thermo fusible material will be between 600 and 1100° C.

The fact of making a sleeve separately from the bore of the barrel and then attaching it on the barrel allows a coating of relatively substantial thickness to be obtained (at least 1 mm) whilst ensuring the homogeneity of the structure and the geometry of the liner throughout the barrel.

The final caliber of the gun barrel is obtained with the required tolerances by a machining or grinding operation of reduced magnitude (small volume of material to be removed).

The mechanical strength of the coating to the firing constraints is improved and the production simplified.

Figure 2A:
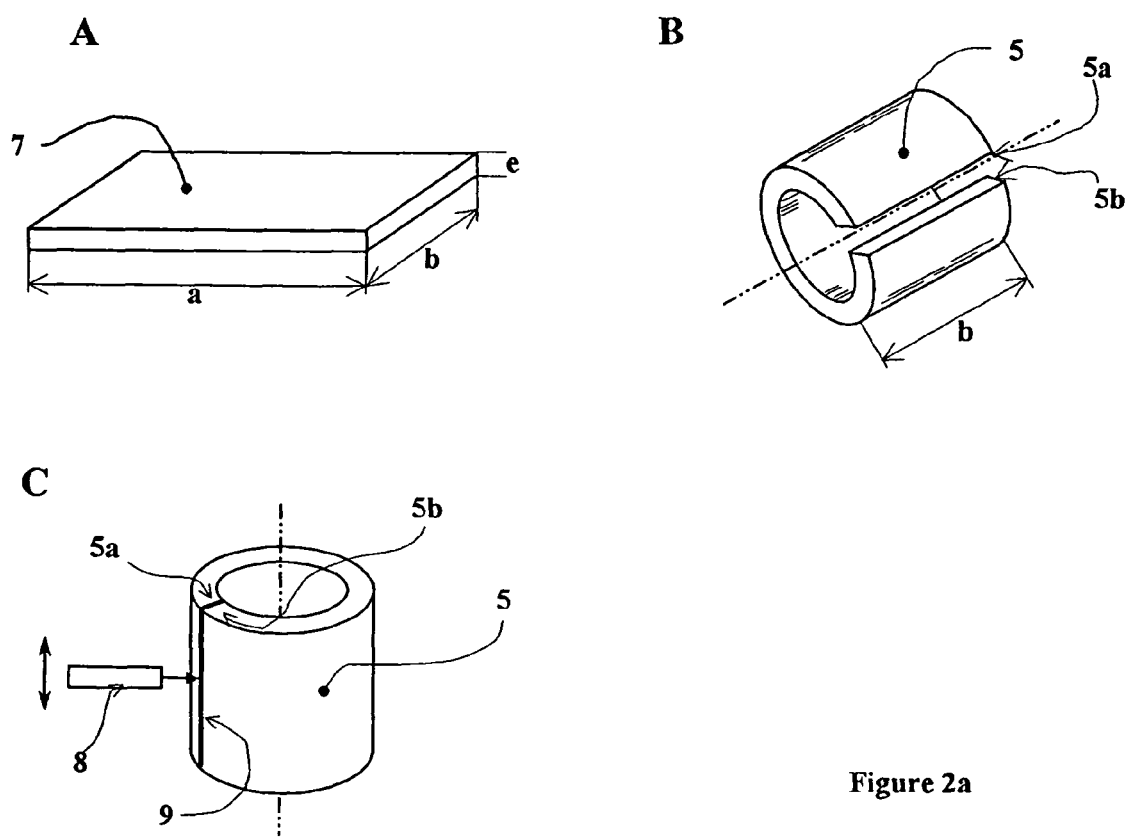
FIG. 2*a* is a schema summarizing the different initial steps in producing a sleeve implemented in the process according to the invention.
Figure 2B:
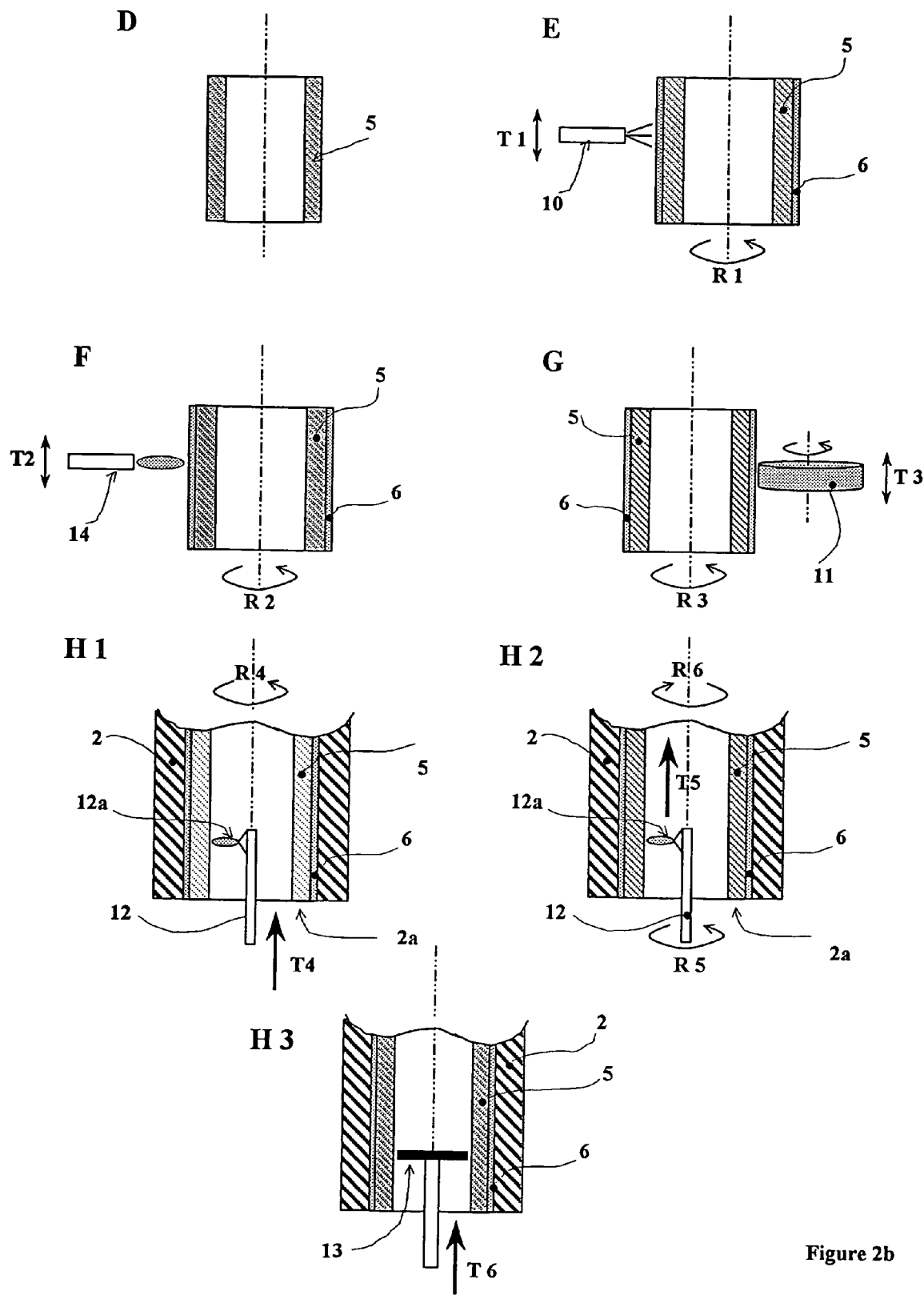
FIG. 2*b* is a schema summarizing the different steps in the process according to the invention.

FIGS. 2a and 2b show different steps in a process allowing such a coating to be achieved.

FIG. 2a show in particular an embodiment of the initial steps in the process.

Step A requires the use of sheet metal 7 having a high melting point, that is greater than 1850° C.

Sheets of Tantalum, Tungsten, Molybdenum, Niobium, Hafnium, Chromium, Vanadium, Zirconium, or an alloy associating one or several of these materials with the possible addition of other elements, may be used.

Such sheets of metal may be easily obtained from a materials supplier. They are made by rolling. The sheet 7 shown here has a length a, a width b and a thickness e. In step B it is rolled so as to form a cylindrical sleeve 5.

The length a of the sleeve is deliberately shown here reduced so that the steps may be visualized in a simplified manner.

In practical terms, a sleeve 5 will be made of the necessary length to protect the barrel. Thus, for a 120 caliber gun barrel, a sleeve 3 to 6 meters long may be made with a thickness of 1 mm and an inner diameter of 120 mm. Rolling is carried out using a cylindrical chuck.

After rolling, step C comprises welding the two edges 5a, 5b of the sleeve 5 by a fusion process (for example, by electron beam or laser). This welding is made, for example, using an electron gun or laser 8 displaced along a generating line 9 of the sleeve 5.

By way of a variant, it is possible for the sleeve 5 to be made by another process, for example by machining or sintering.

FIG. 2b shows the main steps in the process according to the invention.

Reference D shows a longitudinal section of the sleeve 5 obtained after rolling and welding (or after machining or sintering).

During step E, a layer 6 of a thermo fusible material having a melting temperature of between 600° C. and 1100° C. is projected onto the external surface of the sleeve 5.

This layer is made by thermal projection using means 10 (for example, a plasma torch or other projection means for a thermo fusible material).

The torch 10 and sleeve 5 will be given a relative movement (translation T1 and rotation R1) so as to ensure the homogeneous installation of the material 6 over the whole of the external surface of the sleeve 5. The sleeve 5 may be turned about its axis and the torch may be displaced using a slide (not shown).

A deposit of soldering material 6 is thus made of a thickness of around 1 mm.

The final step F consists in re-melting the deposit so as to resorb the coating's porosities.

For this, the soldering material 6 is heated using heating means 14 (such as a blow torch). The temperature will be at least equal to the melting temperature of the soldering material. These heating means will be moved with respect to the sleeve 5 (translation T2 and rotation R2) so as to ensure localized heating allowing the porosities to be resorbed whilst ensuring the integrity of the layer of soldering material 6. The sleeve 5 may be turned about its axis and the torch may be translated using a slide (not shown).

The temperature and speed parameters R1 and T2 will be determined by somebody skilled in the Art according to the characteristics of the barrel and coating (thickness of the coating 6, material of the barrel and coating, soldering material used, . . . ).

Before the sleeve is inserted into the barrel bore its external surface 5 needs, during step G, to be machined to give it an external diameter that corresponds to the internal diameter of the barrel bore with the required adjustment tolerances.

Cylindrical grinding of the soldering layer 6 will be, for example, carried out using a rotating grinder 11 able to move in translation T3 with respect to the sleeve 5. The latter will, moreover, be free to rotate R3 around its axis.

The sleeve 5 will be able to slide in the bore 2 of the barrel.

Instead of grinding the soldering layer 6, machining may be carried out by turning.

The sleeve 5 is then positioned in the barrel 2.

Lastly, the sleeve is soldered in the barrel bore.

This soldering is carried out by applying localized heating means to the inside of the sleeve 5 which are gradually displaced longitudinally from one end to the other of the sleeve 5.

According to a first variant shown in step H1, the localized heating means comprise a plasma torch 12 that functions using the transferred arc (PTA) technique.

In this case, there is no addition of powder, the torch is used merely to spot heat the inner surface of the sleeve 5 using the plasma 12a. By a process of thermal diffusion, this heating ensures the fusion of the soldering material 6 and its adherence to the barrel bore.

So as to ensure the even soldering over the full external surface of the sleeve 5 in the barrel 2, means (not shown) are provided so as to ensure a relative rotating movement R4 of the torch 12 with respect to the barrel 2, such rotation being combined with a translation T4 of the torch with respect to the barrel.

Somebody skilled in the Art will determine the heating temperature as well as the displacement parameters (translation speed T4 and rotation speed R4) according to the thickness of the soldering layer 6 as well as the nature of the material used.

According to a second variant shown in step H2, as an alternative the gun barrel 2 may be kept immobile and a torch having both a rotational R5 and translational T5 movement may be implemented.

It is also possible in this case for a rotation of the torch (R5) to be combined with a rotation of the barrel in the opposite direction (rotation R6 for step H2).

Soldering will thus be carried out progressively along a continuous helicoidal "cord" over the full length of the barrel.

The advantage of this soldering process lies in that it avoids excessive heating of the gun barrel and the sleeve which could result, for example, from the use of a furnace. Excessive heating of the gun barrel would lead to a diminution of the mechanical properties which would induce further thermal processing for the whole barrel.

Such heating could also lead to relaxation of the residual constraints of the barrel and its eventual deformation.

The localized heating proposed by the invention allows the soldering material 6 alone to be melted simply and economically, without any alteration to the material of the sleeve 5 or to the steel of the barrel 2.

Step H3 shows a third variant in which the localized heating means comprise a heat source 13 allowing cylindrically symmetrical heating to be ensured so as to allow localized soldering along a circular generating line.

This source 13 will be constituted, for example, by a cylindrical heating sleeve. The heating sleeve 13 will have an external diameter substantially equal to that of the sleeve 5. It will be heated, for example, by an electrical resistance connected to a generator (not shown).

Somebody skilled in the Art will determine the heating temperature as well as the displacement parameters (translation speed T6) according to the thickness of the soldering layer 6 as well as the type of materials used.

The thickness of the sleeve 13 will be chosen so as to ensure localized soldering on a circular generating line.

Means will once again be provided to ensure the translation T6 of the source 13 will respect to the barrel 2 (for example, a slide).

The advantage of this embodiment with respect to the previous one lies in that it no longer requires the relative rotation of the barrel and the heat source.

A translation T6 of the heat source alone is required to ensure the soldering of the sleeve on the barrel that gradually moves from one end to the other of the sleeve.

By way of a variant, it is naturally possible for other heat sources to be used.

Lastly, it is naturally possible for the coating of a gun barrel 1 to be carried out using several sleeves 5 that will be positioned axially one after the other.

Different materials may notably be selected for different part of the gun barrel according to the severity of the stresses to which the barrel is subjected in the zones in question.

The process according to the invention may naturally also be applied to the manufacture of tubes other than gun barrels, for example, the production of tubes used in the chemical or petrol industries. Thanks to the invention, these tubes easily may be given an inner protective coating at a moderate cost.

The invention claimed is:

1. A process of making a gun barrel, the process comprising the following steps:
   providing a cylindrical sleeve,
   placing a layer of thermo fusible material on an external surface of the cylindrical sleeve,
   machining the cylindrical sleeve with the thermo fusible material thereon to give the cylindrical sleeve an external diameter that corresponds to an internal diameter of a tube,
   positioning the cylindrical sleeve in the tube, and
   heating the cylindrical sleeve from inside the cylindrical sleeve with no added powder using a localized heating means that is positioned within the sleeve to solder the cylindrical sleeve in the tube.

2. A process according to claim 1, wherein the thermo fusible material has a melting point of between 600° C. and 1100° C.

3. A process according to claim 1, wherein the cylindrical sleeve comprises a material having a melting point of more than 1850° C.

4. A process according to claim 1, wherein providing a cylindrical sheet comprises:
   rolling a sheet, and
   welding edges of the sheet edge to edge to form the cylindrical sleeve.

5. A process according to claim 4, wherein the welding is performed by electron beam or laser welding.

6. A process according to claim 1, further comprising machining or sintering the cylindrical sleeve.

7. A process according to claim 3, wherein the cylindrical sleeve is a material selected from the group consisting of Tantalum, Tungsten, Molybdenum, Chromium, Niobium, Hafnium, Vanadium, Zirconium, and their alloys.

8. A process according to claim 1, wherein placing a layer of thermo fusible material on an external surface of the cylindrical sleeve comprises thermal projecting a thermo fusible material powder onto the external surface of the cylindrical sleeve.

9. A process according to claim 2, wherein the thermo fusible material is selected from the group consisting of cobalt and nickel alloys.

10. A process according to claim 1, wherein the thickness of the layer of thermo fusible material is about 1 mm.

11. A process according to claim 1, wherein after placing the layer of thermo fusible material on said external surface of the cylindrical sleeve, the method further comprises re-melting the layer of thermo fusible material on the cylindrical sleeve before machining.

12. A process according claim 1, wherein heating the cylindrical sleeve from inside the tube comprises heating with a plasma torch with transferred arc (PTA) with no added powder, with a relative rotating movement of the plasma torch with respect to the tube, combined with a relative translation of the plasma torch with respect to the tube.

13. A process according to claim 1, wherein heating the cylindrical sleeve from inside the tube comprises cylindrically symmetrical heating.

14. A process according to claim 1, wherein said heating comprises applying heat from a localized heat source inside the sleeve, and gradually moving said heat source longitudinally from one end to the other of the cylindrical sleeve.

15. A process according to claim 1, wherein said heating comprises applying heat from a localized heat source inside the sleeve, and the heat source has a rotational movement and a translational movement.

16. A process according to claim 1, wherein said heating comprises heating with a heat source that ensures cylindrically symmetrical heating.

17. A process according to claim 1, wherein said heating includes no additional powder.

* * * * *

UNITED STATES PATENT AND TRADEMARK OFFICE
CERTIFICATE OF CORRECTION

| | | |
|---|---|---|
| PATENT NO. | : 7,743,965 B2 | Page 1 of 1 |
| APPLICATION NO. | : 10/498115 | |
| DATED | : June 29, 2010 | |
| INVENTOR(S) | : Yann Guilmard et al. | |

It is certified that error appears in the above-identified patent and that said Letters Patent is hereby corrected as shown below:

Title page,
Item (73), Assignee, "Giat Industries, Versailes (FR)", assignee should read --Nexter Systems, Roanne (FR)--

Signed and Sealed this
Eighth Day of March, 2011

David J. Kappos
*Director of the United States Patent and Trademark Office*